United States Patent
Reisch et al.

(10) Patent No.: US 8,397,887 B2
(45) Date of Patent: Mar. 19, 2013

(54) ACTUATING ARRANGEMENT FOR SHIFT ELEMENTS OF A TRANSMISSION

(75) Inventors: Matthias Reisch, Ravensburg (DE); Juergen Wafzig, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 292 days.

(21) Appl. No.: 12/920,323

(22) PCT Filed: Oct. 22, 2008

(86) PCT No.: PCT/EP2008/064241
§ 371 (c)(1),
(2), (4) Date: Aug. 31, 2010

(87) PCT Pub. No.: WO2009/109241
PCT Pub. Date: Sep. 11, 2009

(65) Prior Publication Data
US 2011/0005345 A1 Jan. 13, 2011

(30) Foreign Application Priority Data
Mar. 6, 2008 (DE) .................. 10 2008 012 894

(51) Int. Cl.
*F16D 21/06* (2006.01)
*F16D 23/12* (2006.01)
*B60K 23/02* (2006.01)

(52) U.S. Cl. ........ 192/20; 192/48.2; 192/48.8; 192/84.6

(58) Field of Classification Search ................. 192/84.6, 192/90; 74/89.18, 99 A
See application file for complete search history.

(56) References Cited

U.S. PATENT DOCUMENTS
| | | | |
|---|---|---|---|
| 6,845,854 B2 * | 1/2005 | Mayr | 192/84.6 |
| 2002/0088683 A1 * | 7/2002 | Nestler et al. | 192/84.6 |
| 2010/0006386 A1 | 1/2010 | Ahnert et al. | |

FOREIGN PATENT DOCUMENTS
| | | |
|---|---|---|
| DE | 198 51 466 A1 | 5/2000 |
| DE | 102 38 118 A1 | 4/2003 |
| DE | 103 13 450 A1 | 10/2004 |
| DE | 103 48 312 A1 | 5/2005 |
| DE | 10 2005 048 737 A1 | 4/2007 |
| DE | 10 2006 010 248 A1 | 9/2007 |
| EP | 1 400 716 A1 | 3/2004 |

* cited by examiner

*Primary Examiner* — Rodney Bonck
(74) *Attorney, Agent, or Firm* — David & Bujold, PLLC

(57) ABSTRACT

An actuating system for at least first and second coaxially arranged shifting elements of a transmission, in particular, a dual-clutch transmission (1) with at least two coaxially arranged control devices for actuating the associated shifting elements. The control devices comprise at least one rotary drive (4, 5) and at least one control element (6, 7) which are coupled to one another by corresponding gearteeth such that rotational movement, of each rotary drive (4, 5), can be converted into an axial control movement of the associated control element (6, 7). The axial position of the teeth of the geartooth array, of each control element (6, 7), varies in the circumferential direction, at least over a certain range.

20 Claims, 5 Drawing Sheets

ACTUATING ARRANGEMENT FOR SHIFT ELEMENTS OF A TRANSMISSION

This application is a National Stage completion of PCT/EP2008/064241 filed Oct. 22, 2008, which claims priority from German patent application serial no. 10 2008 012 894.5 filed Mar. 6, 2008.

FIELD OF THE INVENTION

The present invention concerns an actuating system with at least two shifting elements of a transmission arranged coaxially with one another, in particular a dual-clutch transmission.

BACKGROUND OF THE INVENTION

For example, from the document DE 102 38 118 A1 an actuating mechanism for a friction clutch device is known, for the application of actuating forces, in particular engagement or disengagement forces. With the actuating mechanism the friction clutches can be actuated in the engagement or disengagement direction. The actuating mechanism comprises a first actuating element associated with a first friction clutch assembly and a second actuating element associated with a second friction clutch assembly, which can be axially displaced axially relative to an fixed supporting element in order to exert the actuating forces. The actuating elements are associated with an actuator in such manner that rotational movement imparted to a respective actuating element by the respective actuator relative to the rotationally fixed supporting element, is converted to an axial translation movement of the actuating element relative to the axially fixed supporting element.

In addition, from the document DE 103 13 382 A1 a release unit for the clutches of a dual-clutch transmission of a motor vehicle is known. This known release unit comprises two release systems for actuating the clutches, an inner release system and an outer release system being provided, which are arranged coaxially with one another. The release systems comprise ramp arrangements which are nested radially one inside the other and can move relative to one another, so that rotational movement is converted to an axial release movement. To actuate the release systems, cable-pulls, gearwheels or belt drives are provided.

Furthermore, from the document DE 10 2005 048 737 A1 another actuating device for a dual friction clutch device arranged in the drivetrain of a motor vehicle for the application of actuating forces is known, such that each friction clutch assembly is associated with an actuating element. In relation to their axial displacement relative to the supporting element, the two actuating elements are coupled by a coupling element so as to move together, so that over part of the axial displacement range of the two actuating elements, movement of one of the actuating elements in one axial direction causes the other actuating element to move in the other axial direction.

The known actuating systems have in common the disadvantage that for the conversion of rotational movement to axial movement, considerable structural space is needed for the control devices of the actuating assemblies, and this increases the structural length of the transmission.

SUMMARY OF THE INVENTION

The purpose of the present invention is to propose an actuating system for at least two coaxially arranged shifting elements of a transmission, of the type described at the start, which is built as compactly as possible and therefore occupies the least possible structural space.

An actuating system is proposed for at least two shifting elements of a transmission, in particular a dual-clutch transmission, preferably arranged coaxially with one another, with at least two control devices for actuating the associated shifting elements, the control devices each comprise at least one rotary drive or suchlike and at least one control element, the rotary drive and the respective control element are coupled to one another by corresponding sets of gearteeth and the rotational movement of each rotary drive can be converted into axial control movement of the associated control element, and the control elements are arranged coaxially with one another. According to the invention, the axial position of the teeth of the sets of teeth of each control element can vary in the circumferential direction, at least over a certain range. In this way, for example, a progressive, digressive, alternating or suchlike course of the teeth in the tooth set can be realized.

Since rotational movement of the rotary drive is converted to translational movement of the associated control element, an axial path is produced by every rotation angle. In the actuating system according to the invention, in the case of each control element, by virtue of the proposed axial shift of the teeth in the circumferential direction of the tooth set, the axial movement of the control element produced by any rotational movement can be compensated for in such a manner that because of axial compensation along the control range of the control device, the teeth of the rotary drive and of the control element remain fully engaged, since the engagement range of the teeth remains in an axial plane. In this way there is no need for an otherwise necessary widening of the teeth in the axial direction. Consequently, considerable axial space can be saved since the control devices arranged coaxially with one another need allow no, or only minimal space in the axial direction, reciprocally, for the respective displacement range of the other control device.

Furthermore, thanks to the actuating system according to the invention a very compact structural form can be achieved since the two control devices for actuating the two shifting elements, for example the clutches of a dual clutch transmission, can be arranged nested one inside the other. Since the proposed actuating system occupies substantially less axial space, in the case for example of a dual-clutch transmission of countershaft design it can be arranged axially at the level of the constant pinions and countershaft bearings, so that the structural space already present there can advantageously be used for the actuating system.

In an advantageous embodiment of the invention it can be provided that the teeth of each control element are formed as a gearwheel segment with an essentially helical or similar shape, whereby even contours with digressive, progressive or similar pitch shape can be used. Other tooth designs as well are conceivable, which realize the axial offset of the teeth in the circumferential direction and so enable compensation of the axial movement of the control element by rotation of the rotary drive.

For example, the gearwheel segment can be fixed to the respective control element so that rotational movement, produced for example by a pinion of the rotary drive, is transmitted by the teeth of the gearwheel segment to the control element for the axial control movement thereof. To ensure a particularly space-saving arrangement it can be provided that the gearwheel segment on the respective control element is fixed, extending radially outward. Other designs that enable a savings of axial space are also conceivable.

According to a further development of the invention, it can be provided that the width of the respective gearwheel segment in the circumferential direction varies. For example, the width of the gearwheel segment can be varied along the circumference in such manner that areas to which a high torque is transmitted are wider, while areas to which a low torque is transmitted are made correspondingly narrower. In this way, on the one hand material can be saved and on the other hand the free running of the teeth can be optimized.

The type of tooth design of the respective gearwheel segments can be adapted to the installation situation in the transmission in each case. For example, the gearwheel segment can be in the form of a spur gear, worm gear or angle drive. For example, a spur gear can have straight or oblique teeth.

To convert rotational movement of the respective rotary drive into axial control movement of the associated control element, according to a related design of the invention it can be provided that the control elements of the control device are mounted to rotate on a component fixed on the housing. It is also possible, however, for the control elements of the control devices to be mounted to rotate on one another, so that by appropriate blocking of one or the other control element the corresponding conversion of rotational movement to axial control movement is made possible. The term 'mounted to rotate' should be understood to mean a coupling of rotational and an axial movement of the control element at least over a certain range. Thus, 'mounted to rotate' means that rotational movement of the control element is necessarily coupled with axial movement.

A possible design variant of the invention for converting rotational movement to translation movement can provide that the component fixed on the housing is a roller spindle, a ball spindle or suchlike, which is in active connection with a first, radially outer spindle nut as the control element of the first control device and with a second, radially inner spindle nut as the control element of the second control device. Thus, the rotary control element is supported on the housing by means of the roller spindle, so that a linear relationship between rotation angle and axial position is obtained. In addition, the roller spindle can fulfill the function of the radial mounting. Separate mounting points can also be considered.

Another possible design variant of the invention for converting rotational movement to translational movement can provide that the component fixed on the housing is a roller ramp element, a ball ramp element or suchlike, which engages with a first, for example radially outer rotary roller ramp element, ball ramp or suchlike as the control element of the first control device and with a second, for example radially inner rotary roller ramp element, ball ramp element or suchlike as the control element of the second control device. In this way the rotary component is supported on the housing by the roller ramp element fixed to the housing. In this design variant as well, the relationship between the rotational angle and the axial position of the control element can be chosen freely by varying the inclination. For the radial mounting, for example an additional component can be used.

Regardless of the respective design of the invention, the two spindle nuts or the two rotary roller ramp elements can be arranged inside, outside, or next to one another.

A particularly advantageous embodiment of the invention can be produced if the pitch of the roller spindle fixed on the housing or the inclination of the roller ramp element fixed on the housing corresponds approximately to the pitch of the respective helical gearwheel segment. This ensures that axial movement of the control element produced by rotational movement is compensated for by the shape of the teeth of the gearwheel segment. However, other inclinations can also be used.

To attach the housing-fixed component, such as the roller spindle or roller ramp element, to the housing of the transmission, according to a related design it can be provided that the component has a radially outward-extending housing flange element or suchlike as a housing support. For example, this housing flange element can extend at least in the area between the gearwheel segments, approximately helically. This results in a particularly space-saving arrangement. Other designs as well are conceivable.

It is also possible for the moving components of the control devices to be supported or mounted on the component fixed on the housing, for example, by means of sliding elements or suchlike. Depending on the design of the shifting elements to be actuated, the rotary components or control elements of the control devices can act by pressing and/or pulling on the associated shifting element.

As the rotary drive, for example an electric motor with a drive pinion can be used. However, other drive possibilities too are conceivable. Depending on the field of application, the two control elements of the control devices can each be driven by a respective electric rotary drive, or by a common rotary drive. Non-electric drives can also be used.

The drive or rotational axes of the respective rotary drives can be arranged axis-parallel to one another or even skewed relative to the axis of the control devices. The skewed configuration enables a frictionally optimized arrangement of the actuator relative to the rotary drive.

A related further development of the invention can provide that the control devices are coupled with at least one transmission brake. For example, when the rotary drive moves from its null position in one control direction, the clutch made as a shifting element is engaged. When the rotary drive moves in the other direction, the transmission brake is actuated. In the null position the transmission brake and the clutch can be disengaged.

To further optimize the operation of the proposed actuating system, in another design of the invention it can be provided that at least one force compensation element engages the control elements. For example, on the gearwheel segments in each case a compensation spring or suchlike can be provided for force compensation.

Depending on the application concerned, the proposed actuating system can be used for any types of shifting elements, such as clutches or brakes. Preferably an application can be provided for a dual clutch, for example of oil-cooled or even dry design. As clutches, for example friction clutches or even interlock-type clutches can be provided. The clutches can be ones of the normally-open, or of the normally-closed type.

BRIEF DESCRIPTION OF THE DRAWINGS

Below, the invention is explained in more detail with reference to the drawings, which show.

DETAILED DESCRIPTION OF THE PREFERRED EMBODIMENTS

Figure 1:
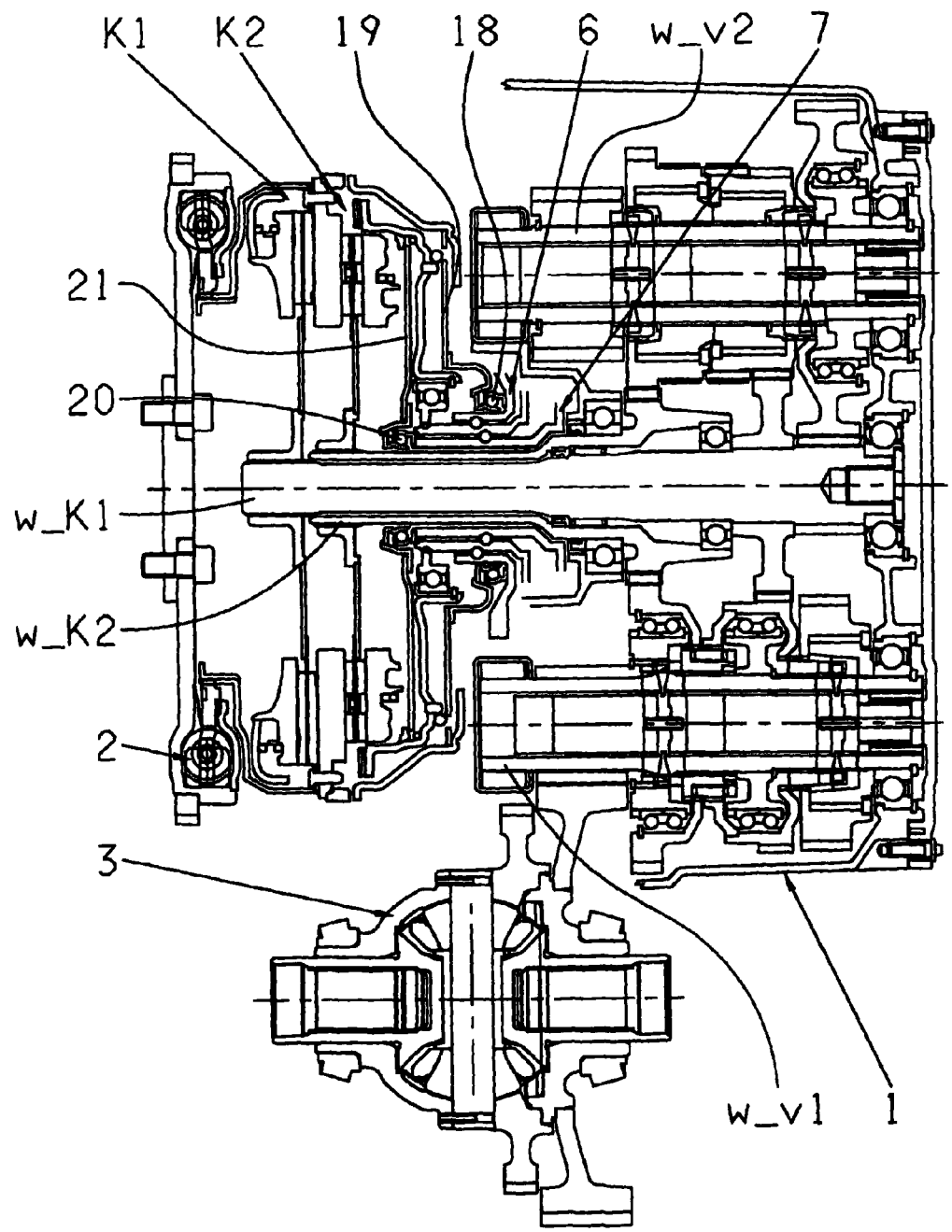
FIG. 1: Sectioned partial view of a dual clutch transmission with a first embodiment variant of an actuating system according to the invention.

FIG. 1 shows as an example, a sectional view of a seven-gear, dual-clutch transmission with a first embodiment variant of an actuating system according to the invention. The representation of the seven-gear, dual-clutch transmission is presented only as an example of a possible application. The actuating system proposed according to the invention can also be used with other transmission systems or suchlike.

The seven-gear, dual-clutch transmission 1 shown comprises two clutches K1, K2, whose input sides are connected to a drive input shaft and whose output sides are connected, respectively, each to one of two coaxially arranged transmission input shafts w_K1, w_K2. In addition a torsional vibration damper 2 is arranged on the drive input shaft. Further, two countershafts w_v1, w_v2 are provided, on which gearwheels for the gears, designed as loose gearwheels, are mounted to rotate. On the two transmission input shafts w_K1, w_K2 are arranged gearwheels for the gears, which are rotationally fixed and designed as fixed wheels, at least some of which are engaged with the loose wheels. To connect the loose gearwheels with the respective countershaft w_v1, w_v2, an internal shift mechanism (not explained further) is provided. Furthermore, drive output gearwheels are arranged as constant pinions on the two countershafts w_v1, w_v2, which are coupled to the gearing of a drive output differential 3.

The dual-clutch transmission 1 shown in FIG. 1 is equipped with a first embodiment variant of an actuating system according to the invention for the dual clutch. The actuating system serves to actuate the two clutches K1, K2 that are arranged coaxially with one another. For this purpose, regardless of the various embodiment variants the actuating system comprises two control devices arranged coaxially with one another, the control devices each comprising at least one rotary drive 4, 5 and at least one control element 6, 7, which are coupled to one another by corresponding teeth such that rotational movement of the rotary drive 4, 5 is converted into axial control movement of the associated control element 6, 7. According to the invention, the axial position of the teeth of the tooth array on each control element 6, 7 varies in the circumferential direction, at least in a certain range.

Thus, the axial control movement of the control element 6, 7 produced by the rotational movement can be compensated for in such a manner that the teeth of the associated rotary drive 4, 5 remain engaged with the teeth of the control element 6, 7 over the entire movement range of the latter. Regardless of the particular embodiment variant, the teeth of each respective control element 6, 7 consist of a gearwheel segment 12, 13 with an essentially helical shape. The gearwheel segment 12, 13 is arranged extending radially outward on the respective control element 6, 7.

Figure 2:
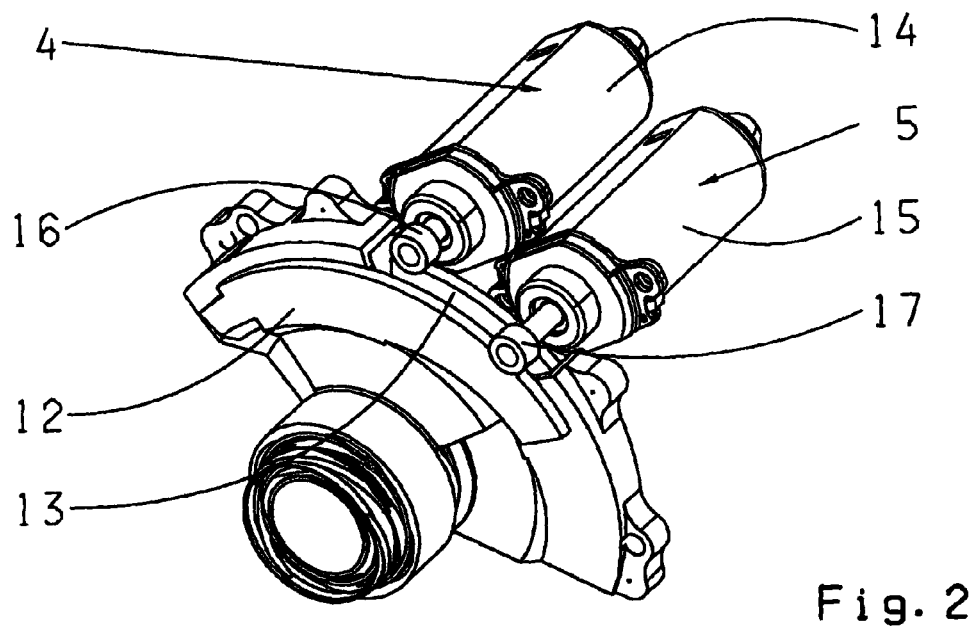
FIG. 2: Three-dimensional schematic view of the first embodiment variant of the actuating system.
Figure 3:
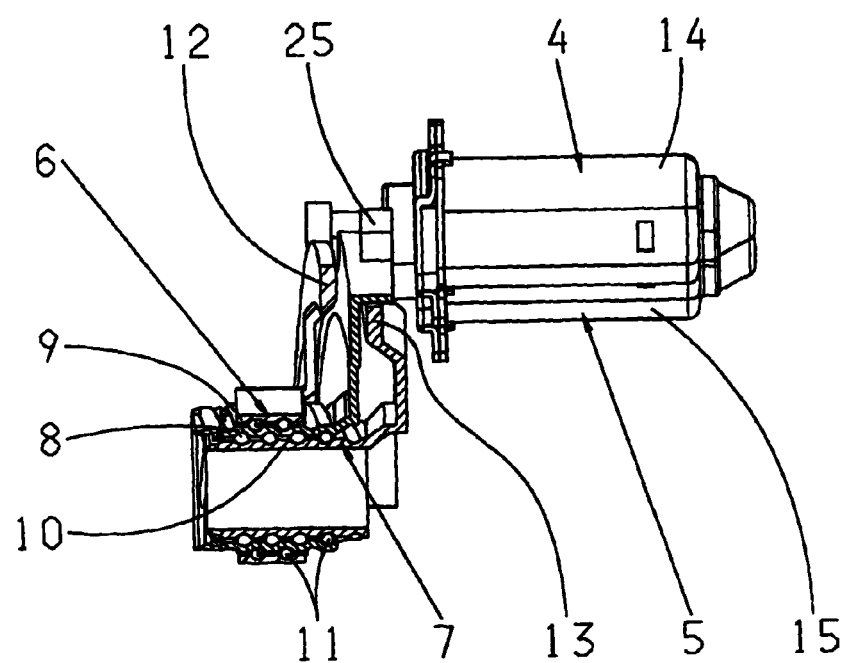
FIG. 3: Sectioned view of the first embodiment variant of the actuating system shown in FIG. 2.
Figure 4:
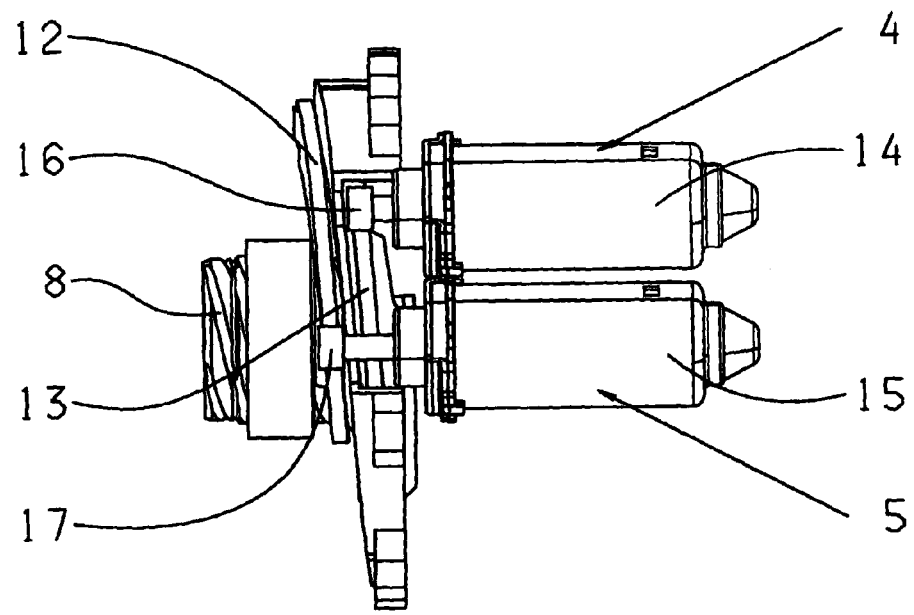
FIG. 4: Plan view of the first embodiment variant of the actuating system shown in FIG. 3.

The first embodiment variant of the actuating system represented in FIG. 1 is shown in greater detail in FIGS. 2 to 4. In this first embodiment variant of the actuating system, as the support on the housing side the control devices comprise a roller or ball spindle 8, on which a first, radially outer spindle nut 9 is fitted as the control element 6 of the first control device and a second, radially inner spindle nut 10 is fitted as the control element 7 of the second control device. In this way a so-termed dual-spindle release is produced with the actuating system according to the invention.

Both the first spindle nut 9 and the second spindle nut 10 are mounted and supported on the roller spindle 8 by rollers 11. The roller spindle 8 is fixed to the housing by means of a support flange 22 extending radially outward. As can be seen particularly clearly in FIG. 3, to save space the radially extending support flange 25 can be arranged axially between the two gearwheel segments 12, 13.

With each control device is associated a rotary drive 4, 5 in the form of an electric motor 14, 15, each driving a respective pinion gear 16, 17. In each case the teeth of the pinion 16, 17 engage the teeth of the associated gearwheel segment of the control device. The gearwheel segments 12, 13 are respectively connected to the first spindle nut 9 and to the second spindle nut 10. In this way, the spindle nuts 9, 10 are moved in rotation by the pinion gears 16, 17 and displaced axially on the roller spindle 8.

As can be seen particularly in FIG. 1, the first spindle nut 9 is in active connection, via an engagement bearing 18, with a diaphragm spring 19 of the first clutch K1 to actuate it, and the second spindle nut 10 is in active connection, via an engagement bearing 20, with a diaphragm spring 21 of the second clutch K2 to actuate it. By virtue of the conversion of the rotational movement into an axial control movement of the spindle nuts 9, 10, the associated clutches K1, K2 of the dual clutch transmission 1 can be actuated appropriately.

FIG. 4 in particular makes it clear that the gearwheel segments 12, 13 associated with the spindle nuts 9, 10 have a helical shape, and that the width of the teeth of the pinion gears 16, 17 corresponds approximately to the width of the teeth of the gearwheel segments 12, 13. This is possible, since the engagement range of the teeth of the pinion gears 16, 17 and those of the gearwheel segments 12, 13 remains approximately in an axial plane because of the helical shape. Consequently, the proposed actuating system takes up particularly little space in the axial direction.

The pitch of the roller spindle 8 corresponds approximately to the pitch of the helical shape of the respective teeth on the gearwheel segments 12, 13. However, the pitch of the helical teeth on the gearwheel segments 12, 13 can be appropriately modified depending on the control range and the actuating force characteristic desired.

Figure 5:
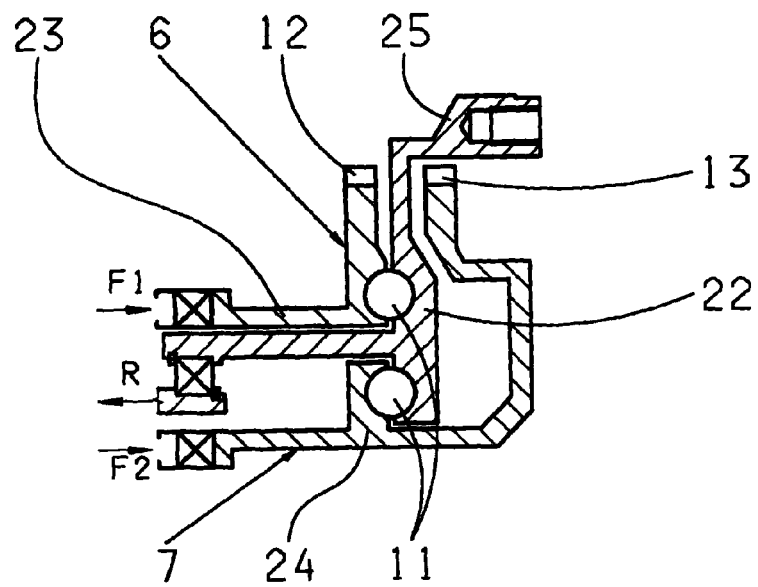
FIG. 5: Schematic view of a second embodiment variant of the actuating system, for two compression clutches as the shifting elements to be actuated.
Figure 6:
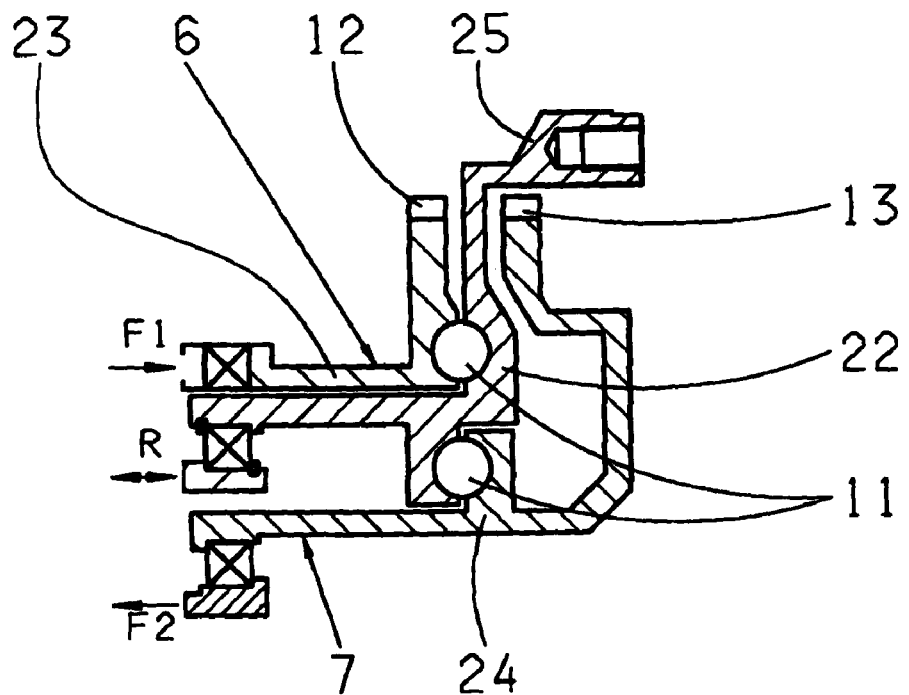
FIG. 6: Schematic view of the second embodiment variant of the actuating system, for one compression and one pulled clutch as the shifting elements to be actuated.
Figure 7:
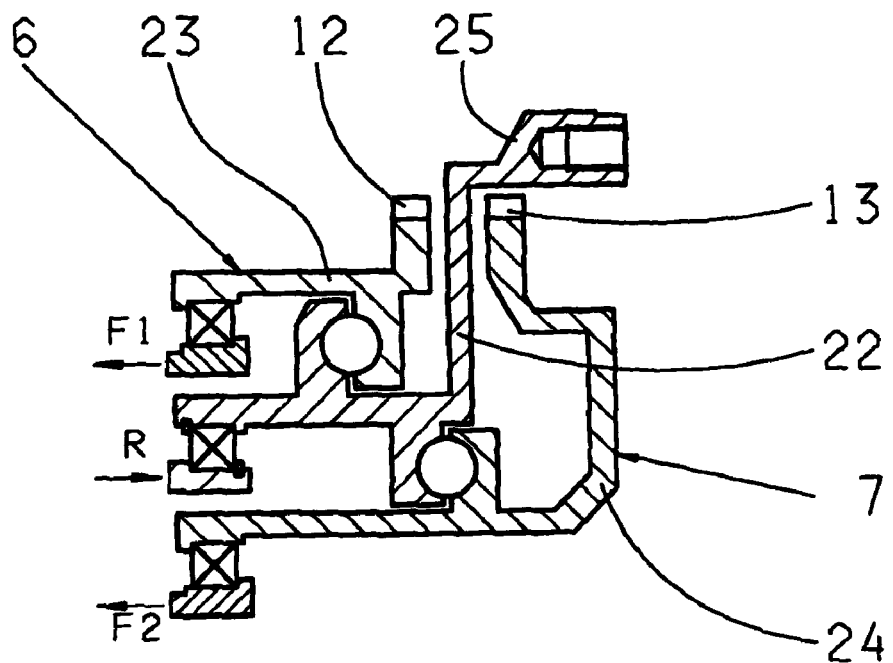
FIG. 7: Schematic view of the second embodiment variant of the actuating system, for two pulled clutches as the shifting elements to be actuated.

A second possible embodiment variant of the actuating system according to the invention is shown in detail, in various versions, in FIGS. 5 to 7. In this second embodiment variant the component fixed on the housing is a roller ramp element 22, which is in active connection with a first, radially outer rotary roller ramp element 23 as the control element 6 of the first control device, and with a second, radially inner rotary roller ramp element 24 as the control element 7 of the second control device. In this way a so-termed roller or ball ramp release is produced with the actuating system according to the invention. Thus, both the first rotary roller ramp element 23 and the second rotary roller ramp element 24 are mounted so that they can rotate on the roller ramp element 22 fixed on the housing.

As also in the first embodiment variant, the gearwheel segments 12, 13 which engage with the pinion gear 16, 17 are arranged, respectively, on the first roller ramp element 23 and on the second roller ramp element 24. The advantages mentioned earlier are also obtained with the second embodiment variant due to the helical shape of the teeth on the gearwheel segments 12, 13.

The various versions of the second embodiment variant of the invention shown in FIGS. 5 to 7 are differently designed in that the actuating systems can be used for clutches of different types. FIG. 5 shows schematically a variant of the ball ramp release for two compression clutches. In contrast, FIG. 6 shows a ball ramp release for one compression and one pulled clutch. Finally, FIG. 7 shows a variant of the ball ramp release for two pulled clutches. The variants differ in that the designs of the roller ramp element 22, the rotary roller ramp element 23 and the rotary roller ramp element 24 are modified or varied in such manner that the direction of the release forces, denoted by F1 and F2, and of the corresponding reaction force, denoted by R, are adapted to the actuation mode of the clutch in each case.

Figure 8:
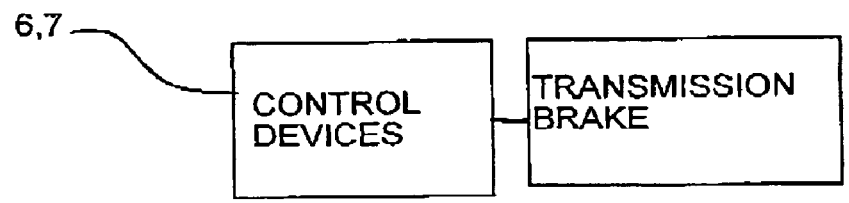
FIG. 8: Diagrammatic view showing the control devices coupled to a transmission brake.
Figure 9:
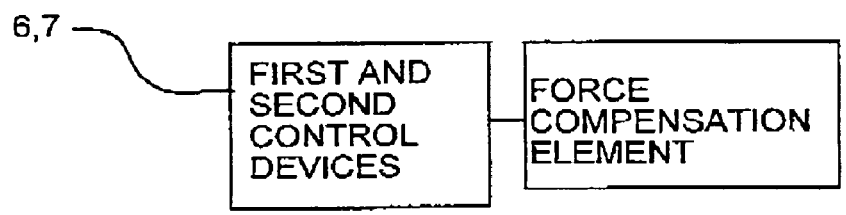
FIG. 9: Diagrammatic view showing a force compensation element engaging with the first and the second control elements.

FIG. 8 diagrammatically shows an arrangement of the actuating system where the control devices 6 or 7 are coupled to at least one transmission brake while FIG. 9 diagrammatically shows an arrangement of the actuating system where at least one force compensation element engages with the first and the second control elements 6, 7.

| | |
|---|---|
| 1 | Dual-clutch transmission |
| 2 | Torsional vibration damper |
| 3 | Drive output differential |
| 4 | Rotation drive |
| 5 | Control element |
| 7 | Control element |
| 8 | Roller spindle |
| 9 | First spindle nut |
| 10 | Second spindle nut |
| 11 | Roller |
| 12 | Gearwheel segment |
| 13 | Gearwheel segment |
| 14 | Electric motor |
| 15 | Electric motor |
| 16 | Pinion gear |
| 17 | Pinion gear |
| 18 | Engagement bearing |
| 19 | Diaphragm spring |
| 20 | Engagement bearing |
| 21 | Diaphragm spring |
| 22 | Roller ramp element fixed on the housing |
| 23 | First rotary roller ramp element |
| 24 | Second rotary roller ramp element |
| 25 | Housing flange element |
| F1 | Release force of the first control device |
| F2 | Release force of the second control device |
| R | Reaction force |
| K1 | First clutch |
| K2 | Second clutch |
| w_K1 | First transmission input shaft |
| w_K2 | Second transmission input shaft |
| w_v1 | First countershaft |
| w_v2 | Second countershaft |

The invention claimed is:

1. An actuating system for at least first and second shifting elements (K1, K2) of a transmission being arranged coaxially with one another, the actuating system comprising:
   at least first and second control devices for respectively actuating the first and second shifting elements,
   the first and second control devices each comprising at least one rotary drive (4, 5) and at least one control element (6, 7) being coupled together by corresponding gearteeth, whereby rotational movement of each rotary drive (4, 5) being converted into axial control movement of the associated control element (6, 7), and the control elements (6, 7) being arranged coaxially with one another, and
   an axial position of teeth of a gearteeth set on each control element (6, 7) varies in a circumferential direction at least over a certain range.

2. The actuating system according to claim 1, wherein the gearteeth set of each of the at least one control element (6, 7) is a gearwheel segment (12, 13).

3. The actuating system according to claim 2, wherein the gearwheel segments (12, 13) each have a substantially helical shape.

4. The actuating system according to claim 2, wherein the gearwheel segments (12, 13) are arranged on the respective control elements (6, 7) and extend radially outward.

5. The actuating system according to claim 2, wherein an axial width of the gearwheel segments (12, 13) varies in a circumferential direction.

6. The actuating system according to claim 2, wherein the gearwheel segments (12, 13) are one of spur gears, worm gears and angle drives.

7. The actuating system according to claim 2, wherein each of the at least one control element (6, 7) of the first and the second control devices is mounted to rotate on a component fixed to a housing.

8. The actuating system according to claim 7, wherein the component fixed to the housing is a roller spindle (8) which is in active connection with a radially outer spindle nut (9) forming the control element (6) of the first control device, and with a radially inner spindle nut (10) forming the control element (7) of the second control device.

9. The actuating system according to claim 7, wherein the component fixed to the housing is a roller ramp element (22, which is in active connection with a radially outer, rotary roller ramp element (23) which forms the control element (6) of the first control device, and with a radially inner, rotary roller ramp element (24) which forms the control element (7) of the second control device.

10. The actuating system according to claim 8, wherein a pitch of the roller spindle (8) or a roller ramp element (22), fixed to the housing, corresponds approximately to that of the associated helical gearwheel segments (12, 13).

11. The actuating system according to claim 7, wherein the component fixed to the housing comprises a housing flange element (25) which extends radially outward as a housing support.

12. The actuating system according to claim 1, wherein the control elements (6, 7) of the first and the second control devices are mounted so as to rotate on one another.

13. The actuating system according to claim 1, wherein the control elements (6, 7) of the first and the second control devices are mounted by sliding elements.

14. The actuating system according to claim 1, wherein the control elements (6, 7) act on the respective associated shifting element via at least one of pressure and tension.

15. The actuating system according to claim 1, wherein rotation axes of the rotary drives (4, 5) are one of parallel and skewed relative to the axis of the first and the second control devices.

16. The actuating system according to claim 1, wherein the control devices are coupled to at least one transmission brake.

17. The actuating system according to claim 1, wherein at least one force compensation element engages with the first and the second control elements (6, 7).

18. The actuating system according to claim 1, wherein the shifting elements are one of oil-cooled clutches and dry-operating dual clutches.

19. The actuating system according to claim 1, wherein the shifting elements are one of oil-cooled brakes and dry-operating brakes.

20. An actuating system for at least first and second transmission shifting elements (K1, K2) being coaxially arranged with respect to one another, the actuating system comprising:
- first and second rotary drives (4, 5), each comprising a pinion gear (16, 17);
- first and second control elements (6, 7), each comprising a helicoidal gearwheel segment (12, 13), the first and the second control elements (6, 7) being arranged coaxially with respect to one another along an axis;
- a fixed ramp element (8, 22) being rotationally fixed to a housing (25);
- the gearwheel segment (12) of the first control element (6) being integral with an outer ramp element (23) actively communicating with the first transmission shifting element (K1), and the gearwheel segment (13) of the second control element (7) being integral with an inner ramp element (24) actively communicating with the second transmission shifting element (K2);
- the outer and the inner ramp elements (23, 24) each communicate with and are supported by the fixed ramp element (8, 22) such that each of the outer and the inner ramp elements (23, 24) being rotatable about and axially movable on the fixed ramp element (22) with respect to one another, the communication between the fixed ramp element (8, 22) and the respective outer and the inner ramp elements (23, 24) facilitating conversion of rotational drive into axial drive such that rotation of the pinion gear (16) of the first rotary drive (4) rotationally and axially drives the gearwheel segment (12) of the first control element (6) and the outer ramp element (23), and rotation of the pinion gear (17) of the second rotary drive (5) rotationally and axially drives the gearwheel segment (13) of the second control element (7) and the inner ramp element (24); and
- axial drive of the first control element (6) facilitating actuation of the first transmission shifting element (K1) and axial drive of the second control element (7) facilitating actuation of the second transmission shifting element (K2).

* * * * *